United States Patent [19]

Snell et al.

[11] Patent Number: 5,035,932

[45] Date of Patent: Jul. 30, 1991

[54] GOLD COLORED POLYOLEFIN CONTAINERS

[75] Inventors: James B. Snell; Marjorie B. Skinner, both of Bartlesville, Okla.

[73] Assignee: Phillips Petroleum Company, Bartlesville, Okla.

[21] Appl. No.: 488,542

[22] Filed: Mar. 5, 1990

Related U.S. Application Data

[62] Division of Ser. No. 282,233, Dec. 9, 1988, Pat. No. 4,946,641, which is a division of Ser. No. 124,804, Nov. 24, 1987, Pat. No. 4,840,997.

[51] Int. Cl.$^5$ .......................... B65D 1/00; C08L 23/02
[52] U.S. Cl. ................................ 428/36.4; 428/403; 428/404
[58] Field of Search ................. 428/36.4, 403, 404

[56] References Cited

U.S. PATENT DOCUMENTS

| | | | |
|---|---|---|---|
| 2,825,721 | 3/1958 | Hogan et al. | 260/88.1 |
| 2,951,816 | 9/1960 | Hogan et al. | 252/467 |
| 3,087,828 | 4/1963 | Linton | 106/291 |
| 3,087,829 | 4/1963 | Linton | 106/291 |
| 3,382,201 | 5/1968 | Gutman et al. | 260/31.8 |
| 3,437,515 | 4/1969 | Quinn et al. | 117/100 |
| 3,819,566 | 6/1974 | Pinsky et al. | 260/42.14 |
| 3,923,726 | 12/1975 | Bonz | 260/40 |
| 3,978,036 | 8/1976 | Pollard | 264/140 |
| 4,049,593 | 9/1977 | Sato et al. | 260/2.5 E |
| 4,376,851 | 3/1983 | Hogan et al. | 526/351 |
| 4,391,941 | 7/1983 | Cotten et al. | 524/495 |
| 4,435,220 | 3/1984 | Watanabe et al. | 106/291 |
| 4,578,296 | 3/1986 | Miyazaki | 428/36.4 |
| 4,605,687 | 8/1986 | Paneesh | 523/171 |
| 4,797,308 | 1/1989 | Mattin | 428/15 |
| 4,818,782 | 4/1989 | Bissot | 524/413 |
| 4,840,997 | 6/1989 | Snell et al. | 525/210 |
| 4,960,639 | 10/1990 | Oda | 428/36.4 |

OTHER PUBLICATIONS

ASTM Method D1765-87a.
E. M. Industries Affair ® Pearl Lustre Pigment Brochure.
Mearl Corp. Mearlin Luster Pigment Brochure.
Ciba-Geigy Corp, IRGAZINE ® Yellow 2RLT Brochure.
Hilton-Davis Chemical Co. Trans-Oxide Brochure.

*Primary Examiner*—Ellis P. Robinson
*Assistant Examiner*—Rena L. Dye
*Attorney, Agent, or Firm*—Lynda S. Jolly

[57] ABSTRACT

A metallic, gold colored polyolefin container prepared from a composition comprising an olefin polymer, a mica-based gold pigment, a mica-based bronze pigment, carbon black, and optionally, a yellow pigment is provided and produced in a grit blasted mold.

17 Claims, No Drawings

GOLD COLORED POLYOLEFIN CONTAINERS

This application is a division of application Ser. No. 282,233, filed Dec. 9, 1988, which is a division of application Ser. No. 124,804, filed Nov. 24, 1987, now U.S. Pat. No. 4,840,997.

BACKGROUND OF THE INVENTION

This invention relates to pigmented olefin polymer compositions.

Conventional color pigments and dyes can be added to polyolefins to produce a variety of pigmented polyolefins. Pigmented polyolefins are aesthetically pleasing, and thus, the resultant colored polyolefin product is more appealing and/or marketable to a consumer. However, pigmented polyolefins are not available in all colors. Metallic colored polyolefins, with a consistent pigment distribution, are difficult to make. The pigments usually used to produce metallic colored polyolefins are metallic based pigments. The metallic based pigment is difficult to evenly distribute in the polyolefin and the resultant molded product frequently is not uniform in color.

Molded polyolefin products, both pigmented and unpigmented, can be produced in grit blasted molds or in polished molds. Polished molds are more difficult and more expensive to produce, because the interior mold surface must be smoothed or polished prior to use. If a polished mold needs to be cleaned during molding operations, the interior of the mold should be inspected for scratches and, if necessary, re-polished. Hence, polished molds are not as easy to use and maintain as grit blasted molds. Additionally, imperfections and blemishes in the final product, which can be caused, for example, by air entrapment, are much more obvious in products produced in a polished mold. Metallic colored polyolefins can be molded in a grit blasted mold; however, a glossy, reflective finish is more difficult to obtain in a grit blasted mold.

OBJECTS OF THE INVENTION

It is thus an object of this invention to provide a metallic colored polyolefin.

It is a further object of this invention to produce a metallic gold colored polyolefin.

It is another object of this invention to produce a metallic Fort Knox gold colored polyolefin.

It is yet a further object of this invention to produce a metallic colored polyolefin product with a glossy finish.

It is yet a further object of this invention to produce a metallic colored polyolefin product with a glossy finish in a grit blasted mold.

In accordance with this invention, it has been discovered that the following compounds, when added in the appropriate concentrations, provide a metallic gold colored polyolefin composition:
a) olefin polymer,
b) mica-based gold pigment,
c) mica-based bronze pigment,
e) optionally, yellow pigment.

In accordance with another embodiment of this invention, a blend of one or more olefin polymers with a plurality of mica-based pigments, carbon black, and optionally, yellow pigment, is blended, extruded, and finally, molded in a grit blasted mold under conditions sufficient to produce a container having a glossy, metallic, gold color.

DESCRIPTION OF THE PREFERRED EMBODIMENTS

The present invention provides a composition and a process to prepare a metallic, glossy, gold colored olefin polymer object in a grit blasted mold. More specifically, the metallic, glossy, gold colored olefin polymer object is a metallic, glossy, Fort Knox gold colored polyolefin product.

Composition

The metallic, gold colored olefin polymer comprises combining pigments with an olefin polymer. At least three pigments, a mica-based gold pigment, a mica-based bronze pigment, and carbon black, are combined with the olefin polymer; a fourth pigment, a yellow pigment, optionally, can be added. Broad, intermediate, and preferred ranges of the olefin polymer and four pigments in the final gold colored product are listed in the following table. The ranges are listed in approximate weight percents of each component in the final composition. The broad ranges were selected in order to obtain the desired coloration results; the preferred ranges are preferred because they define a composition possessing the desired physical and chemical properties best suited to blend, extrude, and/or mold a metallic, glossy, gold colored polyolefin product. Too much mica-based gold pigment results in a product that is too yellow in color; too little mica-based gold pigment creates a bronze colored product. An excess of mica-based bronze pigment produces a product that is too orange and too little mica-based bronze pigment results in a yellow colored product. Too much carbon black creates a dark gold, almost green, product; too little carbon black produces a product too light in gold color. An excess of yellow pigment results in a product that is too yellow in color.

TABLE I

| Ingredient | Broad range, approx. wt. % | Intermediate range, approx. wt. % | Preferred range, approx wt. % |
|---|---|---|---|
| Olefin polymer | 95–98 | 97–97.9 | 97.4–97.7 |
| Mica-based gold pigment | 0.5–4 | 1–2 | 1.5–1.9 |
| Mica-based bronze pigment | 0.01–0.4 | 0.05–0.4 | 0.1–0.3 |
| Carbon black | 0.001–0.006 | 0.001–0.005 | 0.002–0.004 |
| Yellow pigment | 0–1 | 0.02–0.1 | 0.03–0.05 |

As shown in Table I, the final metallic, glossy, gold colored olefin polymer comprises pigment in the range of about 0.5 to about 3 weight percent, based on the weight of the final colored polyolefin. The total amount of pigment in the final product, as given above, is defined as the pigment load or pigment loading factor.

The four pigments useful in accordance with this invention to produce a metallic, gold colored olefin polymer composition are commercially available products. The following tabulation gives possible suppliers and the trademarks for each of the pigment compounds.

The pigment suppliers and trademarks listed in Table II are merely examples of the pigments useful in this invention; the invention is not restricted only to those pigments shown in Table II. As shown in Table II, the gold and bronze pigments are best described as anatase titanium oxide ($TiO_2$) and/or iron oxide ($Fe_2O$, or $Fe_3O_4$.) coated mica, with a particle size of less than about 200 microns. The pigment mica substrate can be described as platelet-shaped, transparent particles, which can include, for example, talc platelets; glass platelets; and various forms of mica, such as, for example, muscovite, white, biotite, phlogopite, related vermiculite, and synthetic micas. The carbon black is best described by the ASTM designation N110, according to ASTM method number D1765-87a; however, other types of carbon black, such as any N100 series, N200 series, N300 series, and mixtures thereof, according to ASTM method number D1765-87a, can also be used. The yellow pigment can be any type of translucent yellow pigment that can blend with a polyolefin.

The olefin polymer useful in this invention can be any olefin homopolymer or copolymer with a density of greater than about 0.94 g/cc. Exemplary polyolefins include, but are not limited to, polyethylene, polypropylene and mixtures thereof. The polyethylene component of the invention can be produced by any method known in the art. One method of polyethylene production uses a silica-supported chromium-oxide catalyst system, such as described in U.S. Pat. No. 2,825,721 and U.S. Pat. No. 2,951,816 by Hogan and Banks, which are herein incorporated by reference. Another method of polyethylene production uses a transition metal catalyst and relatively low temperatures and relatively low pressures.

Polyethylene also can be produced by copolymerizing ethylene with one or more higher alpha-olefin comonomers, preferably, with an alpha-olefin having about 3 to about 8 carbon atoms. The comonomer is normally present in a small percentage, i.e., an amount to maintain a polymer density of greater than about 0.94 g/cc. Usually, up to about 5 mole percent comonomer is present in the total monomer mixture. Examples of ethylene comonomers include, but are not limited to propylene, 1-butene, 1-hexene, and mixtures thereof. 1-hexene, which produces butyl branches, is the pres-

TABLE II

| Pigment Compound | Supplier | Trademark | Reference |
|---|---|---|---|
| Mica-based gold pigment | EM Industries Inc. | Afflair ® Gold Pearl 300 | $Fe_2O_3$ and anatase $TiO_2$ coated mica, particle size 10–60 microns, U.S. 4,435,220 |
| Mica-based gold pigment | Mearl Corp. | Gold Sparkle | $Fe_2O_3$ and anatase $TiO_2$ coated mica, particle size 12–96 microns, U.S. 3,437,515, U.S. 3,087,828, and U.S. 3,087,829 |
| Mica-based gold pigment | Mearl Corp. | Brilliant Gold | $Fe_2O_3$ and anatase $TiO_2$ coated mica, particle size 6–96 microns, U.S. 3,437,515, U.S. 3,087,828, and U.S. 3,087,829 |
| Mica-based bronze pigment | EM Industries, Inc. | Afflair ® Glitter Bronze 530 | $Fe_2O_3$ coated mica, particle size 10–150 microns |
| Mica-based bronze pigment | Mearl Corp. | Golden Bronze | $Fe_2O_3$ and anatase $TiO_2$ coated mica, particle size 6–96 microns, U.S. 3,437,515, U.S. 3,087,828, and U.S. 3,087,829 |
| Mica-based bronze pigment | Mearl Corp. | Super Bronze | $Fe_2O_3$ coated mica, particle size 6–48 microns, U.S. 3,437,515, U.S. 3,087,828, and U.S. 3,087,829 |
| Carbon black | Any carbon black supplier | No trademark, but has ASTM designation of series N100, N200, N300 and mixtures thereof* | Tint strength of about 115 to about 127** |
| Yellow pigment | Ciba-Geigy | Irgazin ® Yellow 2RLT | Red shade yellow organic pigment derived from tetrachloroisoindolinone |
| Yellow pigment | Ciba-Geigy | Irgazin ® Yellow 3RLT | Red shade yellow organic pigment derived from tetrachloroisoindolinone (more concentrated than Irgazin ® Yellow 2RLT) |
| Yellow pigment | Hilton-Davis | Trans-oxide ® yellow | Pigment yellow #42 transparent yellow iron oxide |

*ASTM method number D1765-87a
**Determined according to ASTM method number D3265-85a The metallic, gold colored olefin polymer composition can be prepared directly as a final product with the appropriate weight percent amounts of each component, as earlier shown. However, it is also possible to produce a polymer concentrate blend, which is a metallic, gold colored olefin polymer with more concentrated pigment quantities. This metallic, gold colored olefin polymer concentrate blend can then be combined with an appropriate amount of additional colored or uncolored olefin polymer to produce a metallic, gold colored olefin polymer with a pigment load in the final product in the range of about 0.5 to about 3 weight percent.

ently preferred comonomer. Marlex ® HHM 5502 ethylene-hexene copolymer is the preferred polyolefin component of the invention. Marlex ® resins are available from Phillips Chemical Company of Bartlesville, Okla.

The polypropylene component of the invention can be any crystalline polypropylene, such as described in U.S. Pat. No. 4,376,851 by Hogan and Banks, which is herein incorporated by reference. The polypropylene component can be produced by any method known in the art.

Processing

The metallic, gold tinted olefin polymer composition can be processed to form a glossy, metallic, gold product by sufficiently mixing the necessary components and then extruding the composition into pellets for future use or into a parison for blow molding. The operating, or processing, parameters for the blending and extruding processes affect the appearance, such as, for example, the gloss, texture, tint and hue, of the final metallic, glossy, gold product. The processing parameters especially affect the gloss of the final product. Gloss, defined in terms of this invention, refers to the reflective properties of the surface of the tinted olefin polymer product; gloss does not necessarily imply smoothness or color. When dealing with the composition of this invention, too much rough handling of the olefin and pigments in the form of, such as, for example, shear, grinding, and kneading, results in a loss of gloss in the final product. The olefin polymer and the pigments are dry blended in any type of dry blender, mixer, or tumbler. The blending process produces a dry blended product which is a fairly evenly dispersed mixture of the olefin polymer and pigments. The speed of the blender should be in the range of about 700 to about 1000 rotations per minute (rpm). Preferably, the blender speed is in the range of about 750 to about 900 rpm. Operating the blender at a higher rpm can cause a decrease in the gloss of the final product; too low of a blender speed does not always adequately mix the dry blend.

The dry blended product can then be extruded into pellets for future use or into a parison for blow molding. The maximum screw speed of the extruder is about 80 rpm. Preferably, the extruder screw speed is less than about 70 rpm. An excessively fast extruder screw speed results in a decrease of the gloss of the final olefin polymer product.

The opening or openings of the extruder have a size of greater than about 0.25 millimeters (mm). An opening of less than about 0.25 mm decreases the gloss of the final product.

The operating temperature of the extruder is any temperature appropriate to extrude olefin polymers. The temperature can vary with different olefin polymers. For example, with high density polyethylene, temperatures in the range of about 190° to about 235° C are appropriate.

EXAMPLES

A further understanding of the present invention and its advantages is provided by reference to the following examples.

EXAMPLE 1

(Concentrate Blend)

A pigment concentrate blend in pellet form was made by dry blending the following components in a Henschel mixer at slow speed (about 700 rpm);

| Ingredient | Approximate Wt. % |
|---|---|
| High density polyethylene (HDPE) (1) | 87.742 |
| Gold pearl pigment (2) | 10.8 |
| Glitter bronze pigment (3) | 1.2 |
| Irgazin yellow pigment (4) | 0.24 |
| Carbon black (5) | 0.018 |

1. A polyethylene having a density of greater than about 0.94 sold under the tradename of Marlex ® HHM 5502 available from Phillips Chemical Co., Bartlesville, Okla.
2. A bright, gold, inert, non-toxic, inorganic iron oxide ($Fe_2O_3$) and an anatase type titanium oxide ($TiO_2$) coated mica pearl pigment, having a 10 to 60 micron particle size, sold under the tradename Afflair ® Gold Pearl 300, available from E. M. Industries Inc., 5 Skyline Drive, Hawthorne, N.Y.
3. An inert, non-toxic, inorganic iron oxide ($Fe_2O_3$) coated mica bronze pigment, having a 10 to 150 micron particle size, sold under the tradename Afflair ® Glitter Bronze 530, available from E. M. Industries Inc., 5 Skyline Drive, Hawthorne, N.Y.
4. An inorganic tetrachlorisoindolinone derived red shade yellow pigment, sold under the tradename Irgazin ®Yellow 2RLT, available from Ciba-Geigy, Ardsley, N.Y.
5. A carbon black, designated as N110 according to ASTM D1765.

This dry blend of components was then fed to a 1½ inch Johnson compound extruder, run at a screw speed of 80 rpm, a melt zone temperature (zone 0) of 415° F., a feed zone temperature (zone 1) of 420° F., transition zone temperature (zone 2) of 410° F., a metering zone temperature (zone 3) of 410° F., a die zone temperature (zone 4) of 410° F., and 300 psi pressure at the die inlet which is due to the placement of 20 mesh, 40 mesh, and 60 mesh screens prior to the die (the 20 and 40 mesh screens are used only for support of the 60 mesh screen). The strands from the Johnson compound extruder were then directed through a water bath and a rotating blade Cumberland model size 6, pelletizer to produce gold polyethylene pellets.

EXAMPLE 2

(Full Component Blend)

In a separate run the following ingredients were dry blended in the same Henschel mixer, or tumbler, as in Example 1, at slow speed; his is identified as full component blend:

| Ingredient | Approximate Wt. % |
|---|---|
| High density polyethylene (HDPE) (1) | 97.57 |
| Gold pearl pigment (2) | 1.8 |
| Glitter bronze pigment (3) | 0.2 |
| Irgazin yellow pigment (4) | 0.04 |
| Carbon black (5) | 0.003 |

This dry blend of components was then fed to the same 1½ inch Johnson compound extruder as in Example 1, run at a screw speed of 70 rpm, a melt zone temperature (zone 0) of 405° F., a feed zone temperature (zone 1) of 460° F., transition zone temperature (zone 2) of 450° F., a metering zone temperature (zone 3) of 450° F., a die zone temperature (zone 4) of 450° F., and 500 psi at the die inlet. The strands from the Johnson compound extruder were then directed through a water bath and a rotating blade, Cumberland model size 6, pelletizer to produce gold pellets.

EXAMPLE 3

(Blow Molding)

The concentrate blend, with addition HDPE in a 5 to 1 letdown ratio (such as 5 pounds HDPE with 1 pound concentrate), and the full blend composition, in separate runs were fed to a Kautec model KEB 1 continuous blow mold extruder, run at 65 rpm, zone 0 temperature 402° F., zone 1 temperature 380° F., zone 2 temperature 390° F., zone 3 temperature 410° F., and a die face pressure of 900 psi (no screens were in front of the die). The extruder was connected to a quart oil can split grit blasted mold maintained at a temperature of 60° F. and a blow pressure of 2.25 bars (225 psi). This resulted in a glossy, metallic, Fort Knox gold pigment container having a 2% bottle pigment load. (Percent pigment load means the percent of pigment in the total final resin volume found in the bottle).

The examples have been provided merely to illustrate the practice of the invention and should not be read so as to limit the scope of the invention or appended claims in any way. Reasonable variations and modifications, not departing from the essence and spirit of the invention, are contemplated to be within the scope of patent protection desired and sought.

That which is claimed is:

1. A polyolefin container having a glossy, metallic gold color, made from the composition comprising:
   a) from about 95 to about 98 weight percent olefin polymer, wherein said polymer has a density of greater than or equal to about 0.94 g/cc;
   b) from about 0.5 to about 4 weight percent mica-based gold pigment;
   c) from about 0.01 to about 0.4 weight percent of mica-based bronze pigment; and
   d) from about 0.001 to about 0.006 weight percent carbon black.

2. A metallic gold colored container according to claim 1 further comprising from greater than about 0 to about 1 weight percent yellow pigment.

3. A container according to claim 2 wherein said yellow pigment is a red shade yellow organic pigment derived from tetrachlorisoindolinone.

4. A container according to claim 1 wherein said polymer is selected from the group consisting of homopolymers of ethylene, copolymers of ethylene and higher alpha-olefins, and mixtures thereof.

5. A container according to claim 4 wherein said polymer is a copolymer of ethylene and 1-hexene and wherein said copolymer comprises 1-hexene in the range from about 0.05 to about 5 mole percent.

6. A container according to claim 1 wherein said gold pigment has a particle size in the range of about 10 to about 60 microns.

7. A container according to claim 1 wherein said mica-based gold pigment is a mica-based gold pearl pigment.

8. A container according to claim 6 wherein said mica-based gold pearl pigment is iron (III) oxide and anatase titanium oxide on mica.

9. A container according to claim 1, wherein said bronze pigment has a particle size in the range of about 10 to about 150 microns.

10. A container according to claim 1 wherein said mica-based bronze pigment is a mica-based glitter bronze pigment.

11. A container according to claim 9 wherein said mica-based glitter bronze pigment is iron (III) oxide on mica.

12. A container according to claim 1 wherein said carbon black is selected from the group consisting of N100 series, N200 series, N300 series, and mixtures thereof, according to ASTM method number D1765-87a.

13. A container according to claim 11 wherein said carbon black is N110 carbon black, according to ASTM method number D1765-87a.

14. A container according to claim 1 wherein said pigment loading factor is within the range of about 1 to about 3 weight percent.

15. A container according to claim 1 wherein said container is blow-molded.

16. A high density polyolefin container having a glossy, metallic gold color, made from the composition comprising:
   a) from about 95 to about 98 weight percent polymer of ethylene and 1-hexene, wherein said polymer has a density of greater than or equal to about 0.94 g/cc;
   b) from about 0.5 to about 4 weight percent mica-based gold pigment, wherein said mica-based gold pigment comprises anatase $TiO_2$ and $Fe_2O_3$, coated mica and wherein said mica-based gold pigment has a particle size in the range from about 6 to about 96 microns;
   c) from about 0.01 to about 0.4 weight percent mica-based bronze pigment, wherein said mica-based bronze pigment comprises mica coated with oxides selected from the group consisting of anatase $TiO_2$, $Fe_2O_3$, and mixtures thereof and wherein said mica-based bronze pigment has a particle size in the range from about 6 to about 150 microns;
   d) from about 0.001 to about 0.006 weight percent N110 carbon black, as designated according to ASTM method D1765-87a; and
   e) from greater than about 0 to about 1 weight percent yellow pigment, wherein said yellow pigment can blend with said polymer.

17. A container according to claim 16 wherein said polymer comprises 1-hexene in the range from about 0.05 to about 5 mole percent.

* * * * *